United States Patent [19]

Sachot

[11] 4,117,762

[45] Oct. 3, 1978

[54] MACHINE TOOLS WITH SLIDING TOOL-HOLDING RAM

[75] Inventor: Michel E. Sachot, Orsay, France

[73] Assignee: Societe Hure S.A., Bagneux, France

[21] Appl. No.: 653,750

[22] Filed: Jan. 30, 1976

[30] Foreign Application Priority Data

Feb. 3, 1975 [FR] France .................. 75 03217

[51] Int. Cl.² .................. B23B 47/26; B23C 1/00
[52] U.S. Cl. .................. 90/11 F; 408/235; 408/237
[58] Field of Search .................. 90/11 F, DIG. 28; 408/235, 237, 234

[56] References Cited

U.S. PATENT DOCUMENTS

| 2,945,402 | 7/1960 | Burg | 408/237 |
| 3,546,979 | 12/1970 | Noguchi | 408/235 |
| 3,671,133 | 6/1972 | Galbarini et al. | 408/235 |

FOREIGN PATENT DOCUMENTS

| 1,389,715 | 1/1965 | France | 408/235 |
| 885,426 | 12/1961 | United Kingdom | 408/235 |

*Primary Examiner*—Othell M. Simpson
*Assistant Examiner*—John Sipos
*Attorney, Agent, or Firm*—Darby & Darby

[57] ABSTRACT

Machine tools with a horizontally sliding tool-holding ram in which a force is applied to the anterior end of the ram by a bar which moves with the ram, running on a first roller located on the front of the ram support, and under a second roller located on the rear of the ram support, the different pairs of rollers and the associate bar or bars being disposed and shaped in such a way as to apply, to the anterior part of the ram, an upwardly directed force for balancing the weight of the ram and of the tooling which it carries.

12 Claims, 15 Drawing Figures

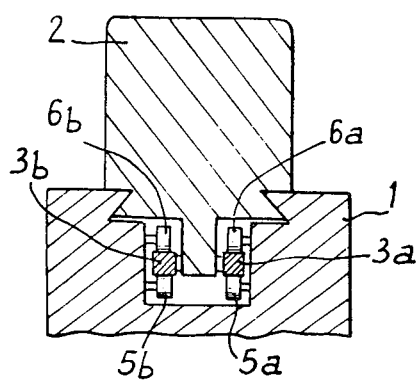
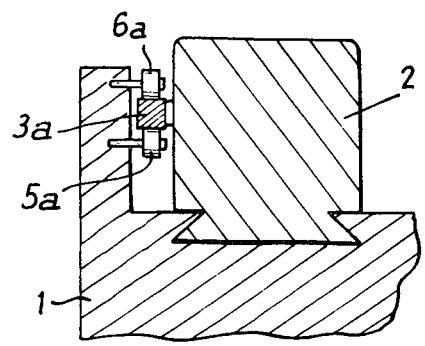
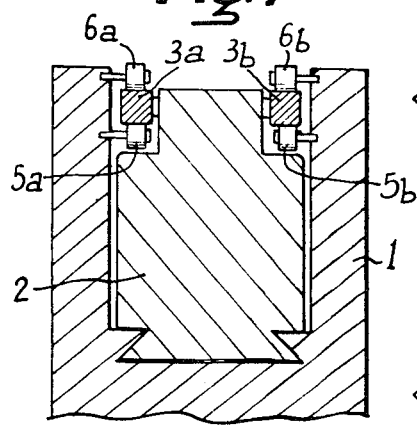
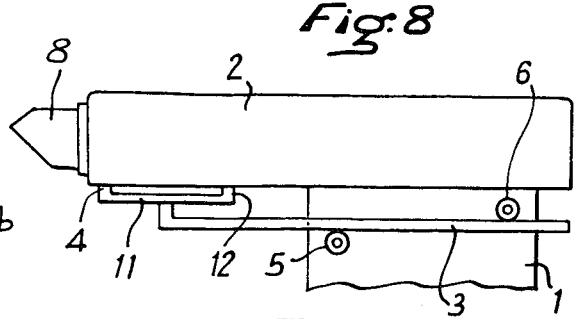
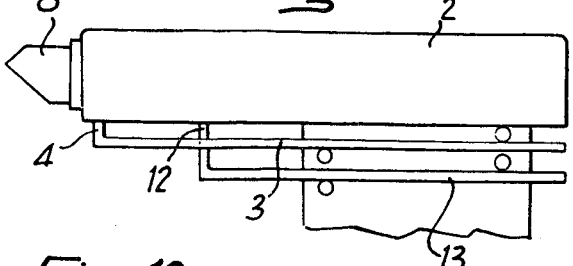
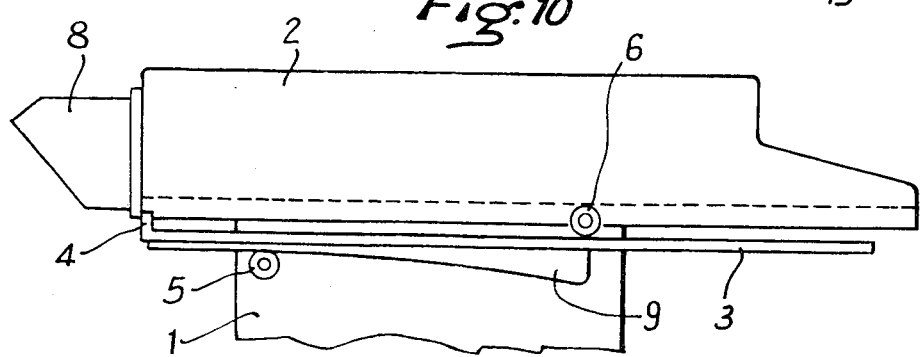

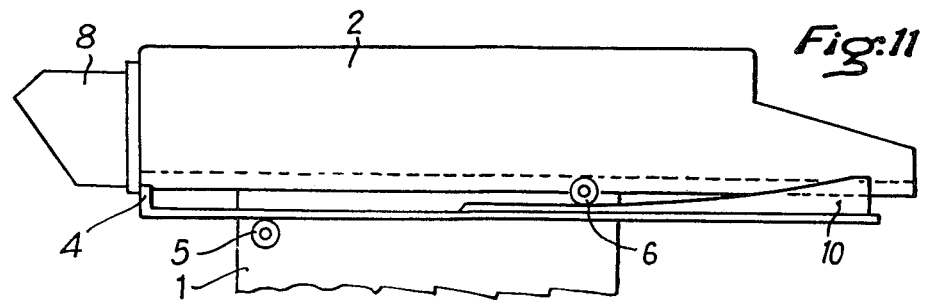
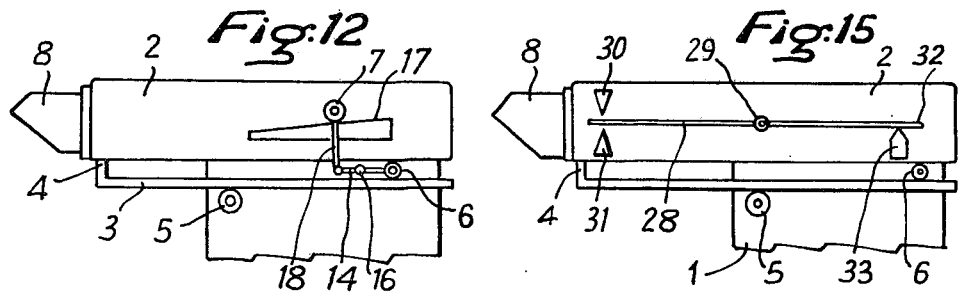
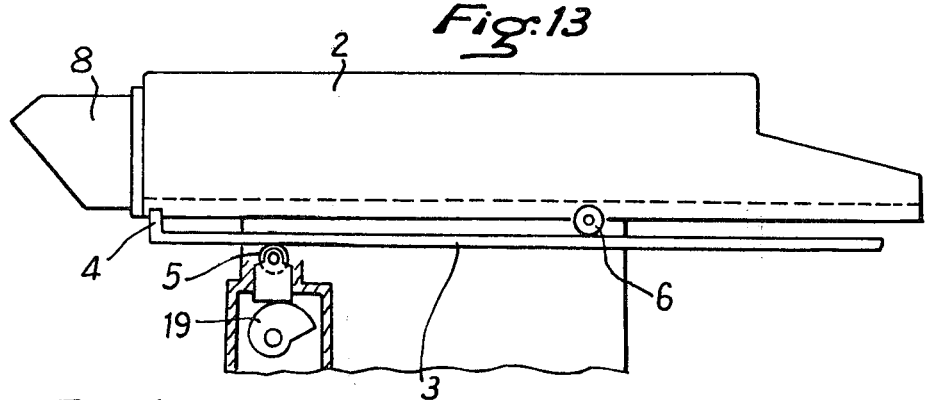
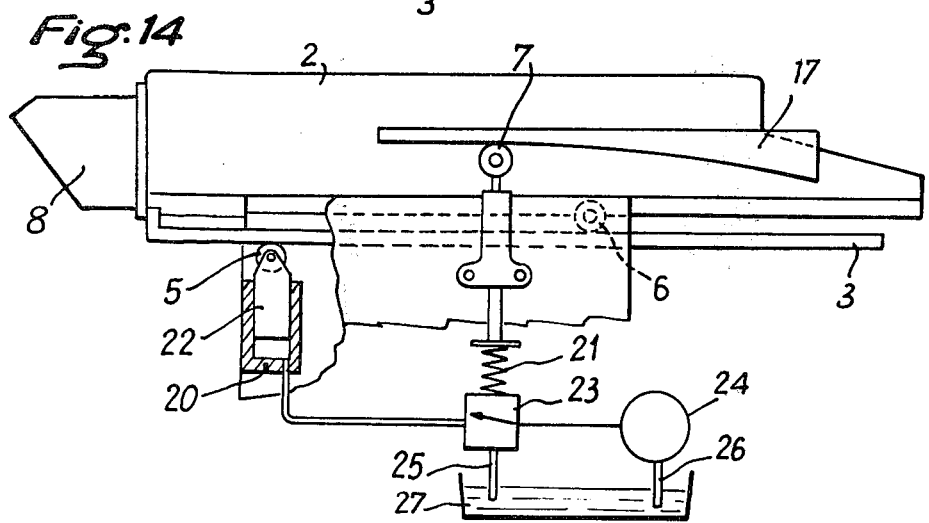

MACHINE TOOLS WITH SLIDING TOOL-HOLDING RAM

On universal-head milling machines, the miller-holding head is mounted at the end of a mechanical assembly called a ram, which slides on horizontal slideways borne by the frame of the machine or by a bracket. As a result of its movement, this ram has a variable overhang over the frame or bracket and it undergoes a bending which is a function of its displacement so that the tool that it carries at its end follows a trajectory which is not strictly linear.

In addition, the tools, and in particular the milling heads, are more or less heavy, and the trajectory travelled differs according to the tool used.

Attempts have been made to remedy this drawback by giving the ram a reverse sag. When this is done, it sometimes occurs that the ram will jam in its guides and that its front face, which conditions the orientation of the tool, in particular the spindle of a milling head, will no longer move parallel to itself. Furthermore, this approach does not generally provide allowances for differences between the weights of the tools.

The object of the present invention is an improvement in a machine of the foregoing type which causes the trajectory of the tool borne by a horizontally sliding ram to be linear.

According to the invention, an upward force is applied to the anterior end of the sliding tool-holder ram by the anterior end of at least one bar which moves with the ram. In a preferred embodiment of the invention, the bar runs on a first roller borne by the front of the ram support and under a second roller borne by the rear of the ram support. The different pairs of rollers and the associated bars are disposed and shaped in such a way as to apply, to the anterior part of the ram, a force directed upward which balances the weight of the ram and the tooling which it carries.

As described below, the invention envisages the following forms and modifications:

(a) The force applied to the anterior part of the ram can be distributed at several points.

(b) The bar can have a profile in the form of a cam, cooperating with at least one of the rollers.

(c) At least one of the rollers associated with each bar can be moved vertically.

(d) The position of the movable rollers can be controlled as a function of the longitudinal position of the sliding ram.

(e) The position of the movable roller or rollers can be determined by a cam profile linked to the ram.

(f) The position of the movable roller or rollers can be controlled by the vertical displacement of the anterior end of the ram head in such a way as to virtually eliminate the vertical displacement thereof.

The invention is illustrated by the attached drawings in which:

FIGS. 5, 6 and 7 are alternatives of the embodiments of FIGS. 3 and 4.

FIGS. 8 and 9 illustrate, diagrammatically, in longitudinal view, two further embodiments of the invention.

FIGS. 10 and 11 illustrate, diagrammatically, the operation of the machine with guide bars for the ram profiled in the form of a cam.

FIG. 12 illustrates, diagrammatically, a further embodiment with a straight bar and mobile roller.

FIGS. 13 to 15 illustrate alternatives of the embodiment of FIG. 12.

Figure 1:
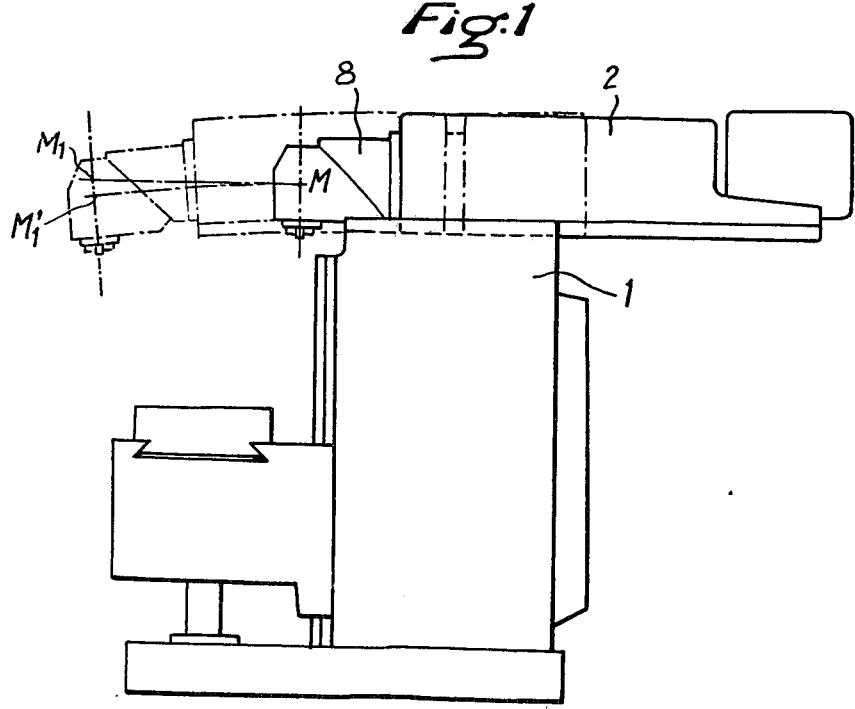
FIG. 1 is a lateral diagrammatic view of a milling machine with ram and universal head of conventional type.

Referring to FIG. 1, we note that the frame 1 of a miller machine carries a ram 2 which slides longitudinally from the extreme rear position, drawn in solid lines, to the forward position, shown in broken lines. In the forward position, the ram sags, and the point M, which would be at $M_1$ after having travelled the horizontal straight line $M\ M_1$, is actually at a lower point $M'_1$ after having travelled the curved path $M\ M'_1$.

Figure 2:
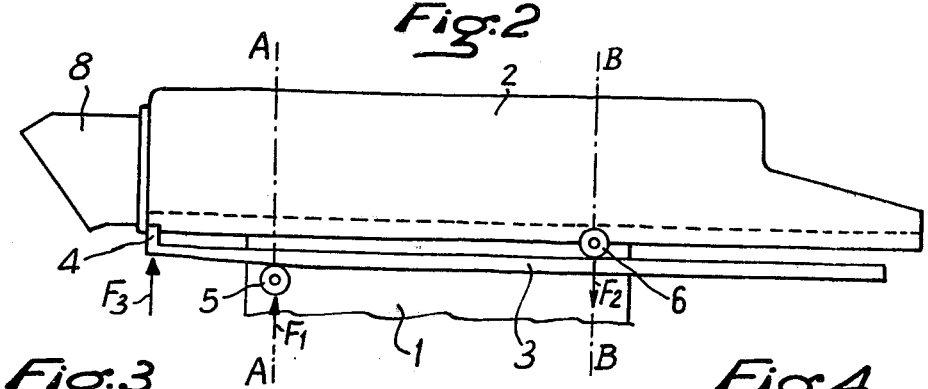
FIG. 2 illustrates, diagrammatically, the principle of the invention, in longitudinal and partial section view.

As shown in FIG. 2 and according to the invention, the anterior (front) end of the ram is held at 4 by the anterior end of a bar 3 which moves with it. Bar 3 travels on top of a roller 5 and under a roller 6, both of the rollers illustratively shown as being attached to frame 1. Roller 5 exerts on bar 3 a force $F_1$ upward and roller 6 a force $F_2$ downward. These forces are determined in such a way that the total force $F_3$ applied at point 4 to the ram balances the weight of the head 8 and of the portion of the ram 2 projecting beyond the slideways on frame 1.

Figure 3:
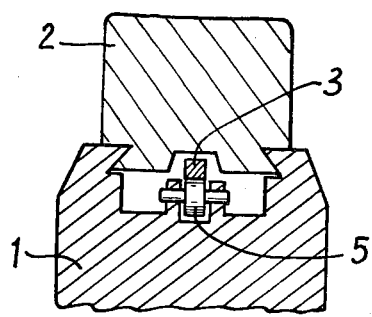
FIGS. 3 and 4 are sections along A—A and B—B of FIG. 2.
Figure 4:
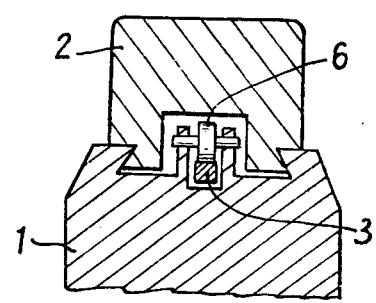

FIGS. 3 and 4 are sections along A—A and B—B in FIG. 2, and show the bar 3 running on roller 5 and under roller 6.

As shown in FIGS. 5, 6 and 7, there can be provided, for a matter of balance two bars 3a, 3b, each one running on and under corresponding sets of rollers 5a, 6a and 5b, 6b. The three figures show various ways of mounting the rollers to the frame.

As shown in FIGS. 8 and 9, the anterior part of the ram can be supported at two points 4 and 12, insuring a better distribution of the upward forces applied to the ram. This can be embodied by means of a compensation bar 11 attached to the end of bar 3 (FIG. 8), or by using a plurality of bars, such as bars 3 and 13 (FIG. 9). In each case, the upward force $F_3$ is distributed to several points along the anterior end of the ram.

The force $F_3$ applied to the anterior end of the ram can be controlled as a function of the ram extension. To accomplish this, the bar can be profiled as a cam (as shown in FIGS. 10 and 11) or the position of one of the rollers 5 and 6 can be modified (as shown in FIGS. 12 to 15).

According to FIG. 10, the lower face of the bar has a cam profile 9 cooperating with the anterior roller 5. The cam profile is such that force $F_3$ provides the proper compensation as the ram is extended further. According to FIG. 11, the profile 10 cooperates with the posterior roller 6. It is likewise possible to profile the bar 3 with two profiles 9 and 10.

The cam, or bar, profiles can be determined experimentally or by calculation. Bars 3, or their cam profiles, are preferably made so as to be easily removable, in such a way as to permit changing bars or profiles. This is advantageous, for example, when the head 8 and/or the tool which it carries is changed, and hence the weight of the anterior part of the ram is varied.

In the embodiment of FIG. 12, roller 6 is movable and displaceable as a function of the front to rear movement of the ram. In FIG. 12, roller 6 is mounted to one end of a lever 14 articulated at 16 on frame 1. The other end of the lever 14 is subjected by a rod 18 to the action of a roller 7 which runs on a cam 17 located on the ram.

In the embodiment of FIG. 13, the roller 5 is subjected to the action of a cam 19. The rotation of cam 19 is controlled as a function of the longitudinal displacements of the ram. For example, cam 19 can be geared to the ram carriage to rotate with it.

In the embodiment of FIG. 14, a roller 7 acts, by means of a spring 21, on a pressure regulator 23 fed by a pump 24, which feeds the piston 22 of a jack 20. At 26 and 25 is shown diagrammatically the intake of pump 24 and the discharge of the regulator into a reservoir 27. Roller 7 follows a cam 17 on the ram and its position controls the pressure produced by pump 24 and, therefore, the position of piston 22 and roller 5. Any other conventional servo system can be used.

In the embodiments of FIGS. 10, 11, 12 and 14, it is the longitudinal position of the ram which determines the force applied at 4 according to the profile of cams 9, 10 or 17.

A servo system such as shown in FIG. 15, permits applying at 4 a force determined automatically in such a way as to keep a strict linearity of the ram. In the embodiment of FIG. 15, a rule, or guide rod, 28 is pivotally mounted at 29 on ram 2, and its anterior end is kept without play between points 30 and 31 on the ram. When the anterior part of the ram sags, the rod 28 pivots around point 29, and its end 32 acts on a feeler 33 which controls the displacement of rollers 5 and/or 6 until rule 28 is re-established in its initial position. Feeler 33 can, for exampler, control the oil supply to piston 20 as in FIG. 14, or the rotation of the cam 19 as in FIG. 13.

We will see from the present examples that the invention can be embodied in a wide variety of forms. It is possible, for example, to combine the embodiments involving the profiled bar 3, in FIGS. 10 and 11, with the embodiments involving displacement of rollers, in FIGS. 12 to 15.

What is claimed is:

1. In a machine tool of the type having a ram and support means mounting said ram for horizontal movement with respect thereto, said ram having an anterior portion for carrying the tool which overhangs the support means by varying amounts when the ram moves, means for providing an upward force to the overhanging anterior portion of the ram to counterbalance its weight and the weight of the tool carried thereby comprising:

at least one bar having an anterior end coupled with the overhanging anterior portion of said ram, said at least one bar being mounted externally of said ram for horizontal movement with said ram and lengthwise pivotal movement independent of said ram;

first and second means mounted on said support means for engaging said bar, said first bar engaging means being located closer to the anterior portion of said ram than said second bar engaging means, said bar being carried on said first bar engaging means and under said second bar engaging means so that said engaging means apply oppositely directed forces thereto, whereby a rotational moment is applied to said bar which provides an upward force to said ram anterior portion to substantially counteract the downward displacement of said anterior portion produced by increasing overhang.

2. The combination of claim 1 wherein said force providing means includes means for varying the amount of force it applies as a function of the distance of the anterior portion of the ram from said support means.

3. The combination of claim 1 wherein said first and second bar engaging means comprise roller means.

4. The combination of claim 1 wherein said force providing means includes means for distributing the force to several points of said ram.

5. The combination of claim 3 wherein at least one of said bars is formed with a cam profile which engages at least one of said rollers.

6. The combination of claim 4 wherein at least one of the roller means is movable vertically relative to a said bar.

7. The combination of claim 6 further comprising means for sensing the longitudinal position of said ram relative to said support means and means responsive to the position of the ram sensed for controlling the vertical position of the movable roller means.

8. The combination of claim 7 wherein said sensing means comprises a cam profile linked to said ram.

9. The combination of claim 6 further comprising means for sensing the vertical displacement of said anterior portion of the ram as it moves vertically, and means responsive to the sensed vertical position of the ram for controlling the vertical position of the movable roller means.

10. The combination of claim 3 wherein at least one of said bars is formed with a cam profile which engages at least one of said rollers.

11. In a machine tool of the type having a ram and support means mounting said ram for horizontal movement with respect thereto, said ram having an anterior portion for carrying a tool which overhangs the support means by varying amounts when the ram moves, the improvement comprising:

at least one bar having an anterior end coupled with the overhanging anterior portion of said ram, said at least one bar being mounted externally of said ram for horizontal movement with said ram and lengthwise pivotal movement independent of said ram; and means mounted to said support means for applying to said at least one bar a rotational moment producing an upward force at the anterior end thereof, said means for applying a rotational moment being constructed and arranged so that the upward force produced thereby substantially counteracts downward displacement of the anterior portion of said ram which results from increasing overhang of the anterior portion.

12. The combination of claim 11 wherein said moment applying means includes means for adjusting the applied moment in relationship to the distance to the anterior portion of said ram from said support means.

* * * * *